UNITED STATES PATENT OFFICE.

JOHN COLLINS CLANCY, OF FREEPORT, NEW YORK, ASSIGNOR TO THE NITROGEN CORPORATION, OF PROVIDENCE, RHODE ISLAND, A CORPORATION OF RHODE ISLAND.

PROCESS OF OBTAINING THE CYANOGEN COMPOUND OF AN ALKALI METAL.

1,352,175. Specification of Letters Patent. Patented Sept. 7, 1920.

No Drawing. Application filed July 13, 1917. Serial No. 180,331.

*To all whom it may concern:*

Be it known that I, JOHN COLLINS CLANCY, a citizen of the United States, residing at Freeport, in the county of Nassau and State of New York, have invented certain new and useful Improvements in Processes of Obtaining the Cyanogen Compound of an Alkali Metal, of which the following is a specification.

This invention relates to an improved process of producing cyanogen compounds and has for one of its objects the provision of a process by means of which pure cyanids and cyanamids may be produced non-catalytically, if desired, and in a substantially chemically pure state.

The present process, in its preferred form is based upon that of Margueritte and Sourdeval, which, as is well known, became public about 1862 and has met with some measure of commercial success.

The cost of separation of the products of this known process has, however, proven to be the source of considerable objection thereto.

Briefly, this known process depends upon the fact that barium possesses the property of readily fixing nitrogen. I have discovered, too, that strontium, also, possesses this property; to an even greater degree. Barium carbonate, however, is comparatively inexpensive and as it does not markedly tend to attack the apparatus in which the operation is usually conducted, and as it is also comparatively readily fusible,—this substance is to be usually preferred.

The process is operated in different known ways, of which, for brevity, I shall cite but one.

First a mixture is made consisting of carbonate of barium with twenty to thirty parts of tar, resin, pitch, wood charcoal or coke, which mixture is heated in a suitable furnace to a high temperature under the action of a current of air. Under these conditions the baryta absorbs nitrogen with great ease, with formation of barium cyanid. This is in turn converted into alkali cyanid by double decomposition, in aqueous solution, with reproduction of barium carbonate; thus:—

$$Ba(CN)_2 + Na_2CO_3 \rightarrow 2NaCN + BaCO_3.$$

Both the cyanid and carbonate are then separated out and, in theory, are supposed to be evaporated to dryness; but in practice this last is a very tedious and costly proceeding, and even then a separation of the alkali cyanid in substantially pure condition is next to impossible.

The problem of cheaply and efficiently separating pure potassium or sodium cyanid from the reformed barium carbonate, together with the $Na_2CO_3$ in solution, is one which seems, therefore, heretofore not to have been solved with complete satisfaction.

I have discovered several things of importance in connection with this process. First, that temperatures as high as those commonly used—*i. e.* 1400° C. or thereabout,—are by no means necessary; but that on the contrary the baryta, in the presence of carbon, or, less advantageously, even in the absence of carbon, if subjected to a current of substantially pure nitrogen, or even of reasonably pure producer gas, can be caused to fix nitrogen at a temperature as low as 800° to 900° C., or in other words at a low red heat, and this especially if a small amount of barium cyanid be present initially in the charge.

This initially provided cyanid is by no means essential, but it seems to favor the starting of the process at the low temperature noted, although in so doing, it does not, I believe properly speaking, behave as a catalyzer; since it is itself of the same substance as the product to be first produced.

The reaction which takes place in the furnace may therefore be set forth as follows:

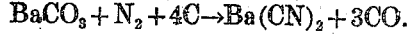

$$BaCO_3 + N_2 + 4C \rightarrow Ba(CN)_2 + 3CO.$$

If insufficient carbon be present some of the carbonate will be converted to oxid of barium.

If now the so formed barium cyanid,—or mixture of cyanid, carbonate and oxid,—preferably without any addition of water,—be fused at a low red heat with, for example, sodium carbonate in the presence of carbon, the double decomposition is effected thus:—

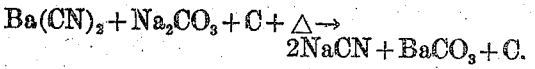

$$Ba(CN)_2 + Na_2CO_3 + C + \triangle \rightarrow$$
$$2NaCN + BaCO_3 + C.$$

If barium oxid be present some oxid of the alkali metal might form were it not for the presence of the added carbon; but insofar as the separation now to be described is concerned, this is immaterial for the reason hereinafter given.

The fused mixture of alkali cyanid and carbonate is now cooled and the mass broken up into, preferably, small particles, which are then treated with liquid ammonia in a closed air and gas tight receptacle.

Ammonia, as is known, possesses the property of dissolving alkali cyanids but the solvent action of this substance upon many salts has not to the best of my knowledge been very fully investigated.

I have discovered that the barium carbonate, and, indeed, all of the reaction products in question are practically wholly insoluble in this liquid, with the single exception of the alkali cyanid to be separated therefrom.

Thus, therefore, not only is the carbonate of barium, or its equivalent herein, insoluble in liquid ammonia, but further any traces of barium oxid, for example, or of the alkali carbonate, or alkaline earth metal cyanid, which may be present, will be left unacted upon.

When the solution is drained or drawn off, it contains substantially nothing but pure alkali cyanid; which is readily recovered therefrom by subjecting the liquid to a gentle heat. The entire recovery operation is preferably so conducted as to exclude air, and the ammonia is collected and condensed in suitable refrigerating apparatus preparatory to its re-use.

The alkali cyanid is obtained, in practice, as a very nearly chemically pure white crystalline product.

In general, while the above described process may be defined as a "dry process", in contradistinction to others which involve the use of water, either to afford a desired reaction or for leaching purposes; it is nevertheless possible, although not so desirable, to dissolve the barium cyanid containing reaction mass in a small quantity of water and to then add the calculated amount of sodium carbonate to form, on heating, sodium cyanid and barium carbonate; the pasty mass, so obtained, being evaporated to dryness. After cooling, the leaching with liquid ammonia can be effected substantially as aforesaid, to dissolve out the alkali cyanid and permit the barium carbonate to be returned to the furnace.

As other alkali metal cyanogen compounds are soluble in liquid ammonia and since cyanamids may be formed in lieu of or from cyanids, in various ways, I desire it to be understood that I do not limit my invention merely to the production of an alkali cyanid, *per se*.

Having thus described my invention, what I claim is:

The process of producing an alkali cyanid which comprises effecting a cyanid forming reaction of free nitrogen upon the carbonate of an alkaline earth metal by initially admixing a cyanid with said carbonate, reacting upon the alkaline earth metal cyanid produced, with the carbonate of an alkali metal to reform said carbonate of an alkaline earth metal and to form the product sought, and extracting the latter from the former.

In testimony whereof I have affixed my signature, in the presence of two witnesses.

JOHN COLLINS CLANCY.

Witnesses:
FRANCIS G. SMITH,
JOHN C. BAXTER.